DIGITAL DATA PROCESSING SYSTEMS

Filed April 29, 1966 3 Sheets-Sheet 1

INVENTOR:
Myron J. Mendelson
Alfred W. England
By [signature]
ATTORNEYS

DIGITAL DATA PROCESSING SYSTEMS

INVENTOR
Myron J. Mendelson
Alfred W. England
By [signature]
ATTORNEYS

DIGITAL DATA PROCESSING SYSTEMS

CHART - Program Lists -

| Set | Index Number | List #1 (Word) Index÷1 | List #2 (Word) Index÷1 | List #3 (Half Word) Index÷2 | List #4 (BYTE) Index÷4 | List #5 (Double Word) Index x 2 |
|---|---|---|---|---|---|---|
| #1 | 0 | 3253 | 3257 | 3261.0 | 3263.00 | 3264 (65) |
| #2 | 1 | 3254 | 3258 | 3261.5 | 3263.25 | 3266 (67) |
| #3 | 2 | 3255 | 3259 | 3262.0 | 3263.50 | 3268 (69) |
| #4 | 3 | 3256 | 3260 | 3262.5 | 3263.75 | 3270 (71) |
| Total List Length | | 4 Words | 4 Words | 2 Words | 1 Word | 8 Words |

INVENTOR:
Myron J. Mendelson
Alfred W. England
By Smyth, Roston & Pavitt
ATTORNEYS 3,405,396
DIGITAL DATA PROCESSING SYSTEMS
Myron J. Mendelson, Encino, and Alfred W. England, Reseda, Calif., assignors to Scientific Data Systems, Inc., Santa Monica, Calif., a corporation of Delaware
Filed Apr. 29, 1966, Ser. No. 546,279
21 Claims. (Cl. 340—172.5)

The present invention relates to general purpose digital computers each having a memory which includes individually addressable storage locations.

During operation of such computers, the storage locations are sequentially accessed, and each accessing is a preparatory step for the subsequent execution of an elementary type operation on one or more number operands. An operand is processed individually or in relation to other operands. Such operands are normally stored in memory locations, for purposes of keeping them available up to the time when needed for processing. An operand thus stored may have been loaded from an external data source into its location, or it may be the result of a previously completed operation. In either case, proper and unambiguous accessing of a storage location is essential in order to regard the operand as being available.

The memory locations are usually identified by numbers called addressing numbers, address codes or just addresses. The exact sequence of accessing memory locations during execution of a program is usually not predetermined, as often there are stored different operands in different locations for use in the same operation, whereby the choice of the particular operand to be used will depend on the outcome of previous operations. Thus, it is not possible for a programmer to provide a program by preparing a fixed list of memory locations (addressing numbers) for all of the operands, and to be accessed as needed. The programmer must have available the possibility that the computer selects among several locations (i.e. operands) the particular one needed in dependence upon previous results which are not foreseeable by the programmer. He can only program a plurality of locations for a plurality of operands and a mode of choice for the unambiguous selection of a particular memory location, so that the sequence of locations accessed may vary as the execution of the program develops. This principle holds not only true for operands themselves but for entire program portions or subroutines. Dependent upon conditions ascertainable only while the program is executed, one or the other among several subroutines has to be executed, and thus provisions must be made for enabling the computer itself to make the required selection.

This selection of the particular addresses is made in that the computer interprets memory address code numbers as real numbers and arrives at the desired address by way of computations. This is accomplished in that a fixed memory addressing number value is programmed by the programmer, and the computer presents a modifier which represents the particular condition developed during previous execution steps for determining in which particular way the program is to go. This process is called indexing, particularly, when the modifier is a number to be added to a first addressing number (called base address) to calculate a second addressing number. The invention now relates to this type of address modifications, whereby, however, the specific arithmetic mode of combining the base address with the modifier is not essential, i.e., an address number may be modified by any known arithmetic operation.

From the standpoint of an economical implementation of a computer memory and its accessing system, it is necessary to provide all memory locations of equal size, whereby the principal factors in determining this size are the number of bits in the computer instructions, the number of bits per unit of input/output information and the number of input/output units containable in a memory location, which number is preferably a power of 2. An instruction usually includes operational control representations and at least one operand address in a concatenated format. Instructions having a number of immediate operation significance as operand are also being used, but are of no interest here. Some systems include several operand addresses in the instruction and/or an address holding the next instruction. How many operand addresses are included in an instruction is likewise not important for the principles involved in the invention, as long as there is at least one operand address, and the invention relates to any such operand addresses.

During computer operation, usually one memory location at a time is accessed and one operand at a time will thus be drawn from memory or passed to memory in a single access step called a memory cycle. On the other hand, operands have variable lengths, and it would be wasteful to always provide one such storage location for one operand alone. Many number operands may fill half of a storage location or less, even merely a quarter location or less. For using the available storage space in the memory to the fullest extent possible, it must thus be possible to put two or more rather short numbers into one storage location, even though these numbers are totally unrelated, and means are to be devised which distinguish among the several numbers stored in the same location.

Conceivably one could devise the memory and its addressing and accessing system to provide for such a distinction, so that a portion of a normal size location can be accessed to the exclusion of the remaining portion thereof. This, however, is not too practical. For reasons of sufficient generality, all memory locations must be capable of holding such short numbers, i.e., it is plainly impractical to partition the memory in a portion for long numbers and a portion for short numbers. Thus, a memory addressing and access control system should always be devised for access in equally sized locations in the entire memory. This means that such a memory design would lead to rather small size locations whereby of course such small size locations would be insufficient to hold a complete instruction word.

For a given size memory, the smaller one selects the size for an individually addressable location, the larger will be the addressing code needed to unambiguously distinguish among all of the locations. As this would lengthen the instruction word, the problem is compounded. Several, even many memory locations would be required to hold one instruction word, so that multiple location addressing would be needed for drawing one instruction out of memory.

The computer improved in accordance with the present invention handles the situation differently. An individual location accessed by the access control is not of the size of the smallest number size or format to be distinguished, but has the size of the instruction word. Thus, for each memory accessing step the entire content of such a location is affected, even if it contains two or more, more or less unrelated small number words. The processor is designed to distinguish between the wanted and the unwanted portions of the content of such memory location leaving the unwanted portion intact and using only the wanted one. Here it must be noted that a withdrawal of data from memory is a copying process, so that the unwanted portion of the copy can be destroyed, as the "master" still is retained in the memory location accessed for further copying.

The distinction between the wanted and the unwanted portion of a memory location is made in two steps. Pursuant to the first step the operation control distinguishes as to the size of the portion wanted, and in the second step, indexing is used to select the particular portion of the complete content of the full memory location. The process of indexing, in general, renders available a number for modifying the address of an operand as it is present in an instruction after the instruction has been withdrawn from memory for purposes of execution. This leads to the significant aspect that the above outlined purpose of indexing is not restrictive as to the extent of its conceivable uses.

Three points are important here. The process of indexing, i.e., of modifying the address of an operand requires the availability of a modifying number when indexing is required. The same process can render available information of intralocation significance to identify a particular portion in an operand location. Thus, the principle of indexing can be modified in that it renders available two numbers, or a single number having two portions, one thereof for modifying the operand address, the other one for identifying a desired portion of the operand located at the modified operand address. The second point is that an address modifier number may be developed by the computer in dependence upon operational conditions, but such number can also be programmed or there may be a combination in that a modifier is preprogrammed and that the modifier itself may be subjected to modifications during execution of the program. Thus, intralocation identifying numbers can be programmed and rendered available by indexing. This leads to the third point, namely, that indexing can then be used in cases to exclusively provide intralocation identifying signals without modifying the memory address location as presented.

Often a program will be dealing with several lists of information where the data in each list is of varying lengths. For example, a program might wish to perform the same operations on several sets of data. Each set of data might consist of small numbers, large numbers, and various numbers inbetween. The data might consist of the numbers A, B, and C where A is *b* bits long, B is *c* bits long, and C is *d* bits long. Each set of data would have a number corresponding to A, a number corresponding to B and a number corresponding to C. It would be convenient to group all the numbers of A length together, all the numbers of B length together, and all the numbers of C length together to form three lists with $A_1$ being the first number on the A list, $A_2$ the second number, and $A_k$ the *k*th number. Similarly, it would be convenient to group the B numbers in the same way and the C numbers in the same way so that the *k*th set of data would consist of $A_k$, $B_k$, and $C_k$. It would then be convenient to have access to all of the numbers in the *k*th set regardless of their size by the use of one indexing number in order to simplify programming and cut down the number of core memory locations occupied by indexing values. It is a feature of this invention that a set of data consisting of words, halfwords, bytes, and double-words or other information equal to a portion of full memory location size may be located in memory so as to be addressable by the use of a single address modifier.

It is another feature of the invention that during particular phases of computer operation, specifically when an instruction word with an operation code and one or more memory addresses has been withdrawn from memory, a number may be presented in the processing unit. The number is used in toto for indexing in case the operation is a regular one for a full word number operand. The number can be interpreted differently in response to an operation or control code affecting only half or quarter words. In this case only a portion of the index number is used for memory address modification, and the remaining portion is used for defining the particular portion of the operand address content to be affected.

The aforedescribed principle permits a modified interpretation of a regular memory address as it is effective in the memory access control system. The regular address number defines only full length locations. By implied concatenations of low order digits to a regular memory addressing number, half word and quarter word addressing numbers can be defined. These half word or quarter word addresses have no operative significance as far as actual memory accessing is concerned, but the definition of half word or quarter addresses facilitates programming. The low order bits of such quarter word addresses or half word addresses are then made part of indexing numbers, rendered available when the respectively associated full memory address becomes the current operand address. This full memory address which is included in the respectively defined quarter and half word addresses is treated in the usual manner as operand address in the program.

Somewhere in the system, outside of the memory, means are to be provided for distinguishing among the different types of addresses and among the addresses themselves when the program is executed. The processing unit supplements a regular addressing number with additional numerical information by way of indexing, so that subsequently the processing unit can meaningfully operate with a subdivided addressing continuum for actually differentiating among portions of the contents of a regular memory address, but outside of the memory. Indexing operates here in that the processing unit concatenates low order digits to a regular type addressing number that has been presented by the memory to the processor, whereby the low order digits for supplementing the regular addressing number are derived from the indexing number rendered available otherwise. This way, the processor can operate with half and quarter word addresses even though the memory does not differentiate within the content of a memory location.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

Before describing the implementation of the present invention, it shall be described in general but in some greater detail how data are organized in a digital computer which is improved in accordance with the present invention. All information in the computer is represented by combinations of the binary digits 1 and 0 also called bits. Each information bit can thus have either one of these two values, and represents the quantity of the smallest order. The quantity thus represented may have numerical significance, control significance or both.

Binary digits in most instances are organized in groups and appear in such groups in a certain order. The position a particular bit has within this order determines its relative digital position value, if the bit constitutes a digit of a number. The position of a bit has control and operative significance within a group of bits defining an operating or control code. A group of ordered bits may constitute a single number, or several unrelated numbers, or a portion of a number, or a plurality of associated numbers, or a single operating or control code, or a plurality of such codes or a combination of numbers and/or control codes.

One of the basic components of a computer is its memory having storage cells for individually storing these quantities of the smallest order, i.e., one bit can be stored in one cell. In most instances the individual bits form a component of a group of bits, whereby the group has particular significance as stated; such a group may have numerical or control significance or both. Since usually it is the significance of the group as a whole which is of interest as far as utilization is concerned, the cells in which a group is or is to be stored in the memory will be called upon simultaneously. For reasons of organizing the handling of data, particularly with regard to storage in and retrieval from memory, it is necessary to select a group size, which is the most frequently occurring size with regard to the number of bits concurrently handled by an operational step. Such group will in the following be called a full word or just a word which is a conventional designation.

Numerical and control data are thus organized primarily in words whereby each word comprises a particular number of bits concatenated in a predetermined order. Herein a word either represents a signal number or a combination of numbers and/or of control codes, whereby the combination has associative significance. For purposes of describing the present invention it shall be assumed that each word may have thirty-two bits. This number is basically arbitrary and is determined in accordance with the factors set forth previously. This includes the size of the address for the selected size of the computer memory, and the number of bits to define all the control information to be related to the address. The instruction word format will be described in greater detail below.

Figure 1:
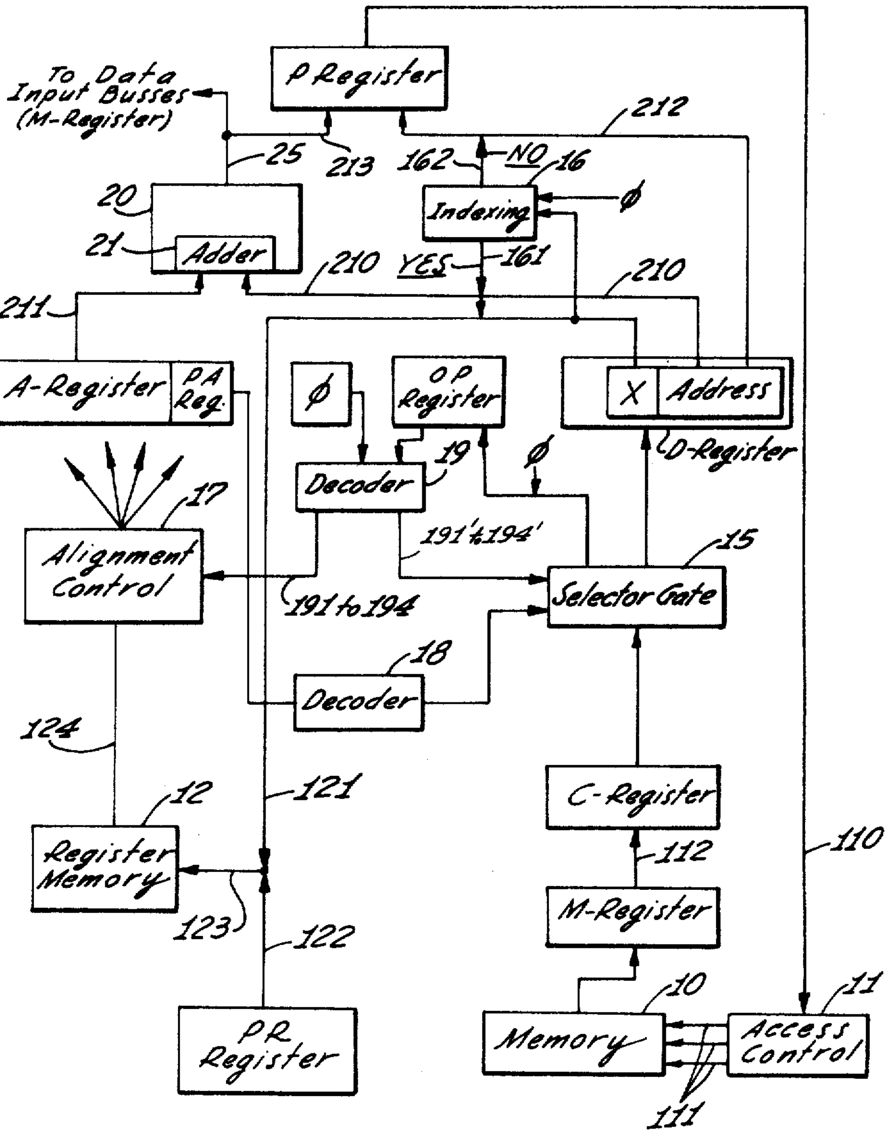
FIGURE 1 illustrates schematically a diagram of the pertinent registers of a general purpose digital computer improved in accordance with the present invention.
Figure 2:
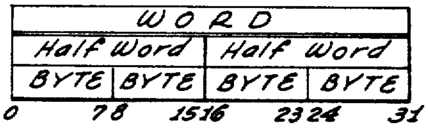
FIGURE 2 illustrates schematically the definitions of words, half words and quarter words in relation to a regular, addressable memory location in the memory of the computer shown in FIGURE 1.

We now proceed to the description of FIGURE 1 which shows the general layout of the several registers of the processing unit in a computer, which are the registers materially participating in the practicing of the present invention. The processing unit cooperates with a main memory 10 which was referred to above repeatedly. This memory may be a random access type memory having, for example, ring cores individually defining the storage cells for a bit, and being organized in order to permit addressing to the word level. Thirty-two ring cores define one storage location for a word and are concurrently addressable as a storage location. The construction of such a memory is known and does not require elaboration.

For controlling the access to individual memory locations there is provided an access control system 11 which has an input bus 110 and output channels 111. The input side of addressing bus 110 receives a 17-bit code interpreted as a word addressing code number as well as control signal to control the actual access to a particular memory location. The output channels 111 call individually on the particular word address location the address code of which then being applied to the addressing bus 110. Additionally, the memory control requires a distinction between memory read and memory write operations, but this does not form a part of the present invention and conventional methods can be adopted here.

Data are handled in the computer basically to the word level. That is to say that the general storage device or computer memory is organized to hold information organized in words. This organization scheme means that thirty-two bits can be stored simultaneously in one memory storage location having thirty-two storage cells accordingly. The word may be the most frequently used combination of bits in the computer, but not all information requires thirty-two bits for concurrent presentation. If, for example, many numbers used for a computation have considerably less than thirty-two digits in binary expansion, it would be wasteful to use one memory location per number. Thus, the computer must not be restricted to handle only bit combinations to the word level. Accordingly, it may be useful at times to operate with a half-word which has sixteen bits in the chosen bit format and should be susceptible of being handled in this format. Thus, two half-words can be stored in one memory location, whereby the information expressed by these two half-words may be totally unrelated. For still smaller numbers, a quarter word or byte must be distinguishable, having accordingly eight bits, so that four, possibly unrelated bytes can be stored in one memory location within the definition given above.

There is provided a memory register, in the following briefly called M register, and this M register is coupled to the main memory in that the data read from the particular memory location addressed by the access control 11, is passed into the M register. Likewise, information to be stored in memory is set into the M-register and copied from there into the concurrently accessed location.

It is specifically pointed out that in case of retrieval of information from the memory, always the entire content of an address location to the word level is passed into this M register. Thus, the M register has thirty-two stages, and it receives the entire content of the address memory location. This holds true even if only half-a-word or a quarter word or byte is needed. Thus, the data transfer between M register and memory always involves full words, as half-words or bytes are not addressed through the access control 11. The separation of the wanted half-word or bytes from the remaining portions of the word not needed is controlled subsequently.

The M register will in most instances pass its content into a second register which is part of what is usually called the central processor. This control register will in the following be called C register, and it is the principal input register for words received from memory via the M register. Always a full word is transferred to the C-register in a parallel by bit format, so that there are altogether thirty-two parallel bit channels 112, also called data input bus for the processor.

The output side of the C-register is connected to the input side of a D-register for an immediate but selective transfer of the data to the D-register. Thus, the connection between the C and D registers for transfer of data from the C register passes through a selector gate or selective transmission network 15. This selector gate 15 will be described more fully below and with reference to FIGURE 5. Briefly, it is this selector 15 which now provides for the selectivity with regard to bytes, half-words and words. This means in particular that all of the bits held in the C register are transferred to the D register in case the operation is to the full word level. For half word operations the selecting device 15 permits only the affected half word to be copied from the C register to D register while suppressing the other half word. For byte operations, the selecting device 15 suppresses the three unaffected bytes and permits only the particular byte which is of interest to be transferred from the C register to the D register.

Aside from words, half words or bytes having immediate numerical significance and representing numbers to be processed or which have resulted from an arithmetic process, the instruction word is the most frequently occurring type of words to be handled in the computer. The instruction word basically is a combination of several groups of bits having associative significance. The transmission device 15 operates always to the full word level if the word to be transferred from the C register to the D register is an instruction word, because the instruction word is always a full word. The instruction word format for the present computer is shown in FIGURE 3.

As stated, the instruction word has thirty-two bits which are distinguished by bit position numbers ranging from bit position 0 to bit position 31 inclusive. The first eight bit positions, or bit position 0 through 7, represent an operating code which is a code representation of a particular type of operation to be performed by the computer during a particular phase of its operation. Operate codes of this type for example are selected for storing, loading, adding, multiplying, etc. This portion of the instruction word is called the OP-field and held in a register OP as long as needed for controlling the particular operations as defined by the OP code.

In case the D register receives an instruction word, the OP register will receive concurrently the OP field of the instruction word. A signal from a timing and phasing unit $\phi$ controls the setting of the byte which occupies bit positions 0 to 7 of an instruction word into the OP register. Since the D register is needed for other operations, the OP register is necessary to hold the operate code for the duration of the execution of the particular operating instruction for the particular operation. Actually, the OP-code is not needed in the D-register at all and could be suppressed, and needs to be set only from the C register into the OP register after the withdrawal from memory. However, the OP-code when in the D-register does not produce any harm so that it may simply be unnecessary to suppress the transfer of the OP code into the D-register.

Figure 3:
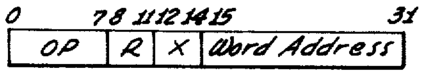
FIGURE 3 illustrates schematically the format of an instruction word used in the computer shown in FIGURE 1.

The instruction word as shown in FIGURE 3 includes additionally numbers having also operative significance. In particular, the four bit positions succeeding the operation code, i.e., bit positions 8 through 11, represent an addressing number for identifying and enabling the accumulator register which is to be used for the particular operation as defined by the OP field, and this R field, therefore, defines a particular register (one out of sixteen), holding a number to be processed in a manner defined by the code of the OP field and determining, in addition, that for purposes of this operation the particular register identified by this addressing number is to serve as accumulator.

The registers as defined by the R field pertain to a so-called fast access or register type memory described in greater detail in the copending application Ser. No. 572,835, filed Aug. 16, 1966, having a common assignee. For the present invention it suffices to note that the R field of an instruction word defines and identifies one out of sixteen individually addressable registers, and it will be described more fully below how the number of addressable registers can be extended without increasing the number of bits in the R field of an instruction word. In FIGURE 1 these registers are included in the register memory 12.

The bit positions 12, 13 and 14 of the instruction word define the addressing code for the register to be used for indexing. The index registers are included in the register memory 12. This three bit field is capable of defining eight different register addressing values. However, in this three bit field or X-field the value (0 0 0) is not being used to identify a particular index register, but to denote the fact that indexing is not desired. The remaining seven different bit combinations which can be expressed by three bits respectively define one out of seven index registers.

The fifteenth through thirty-first bit positions of an instruction word define in binary code a number identifying a word address of an operand. It will be recalled, that for purposes of describing the present invention we exclude the case that an instruction word identifies an operand immediately. Thus, these seventeen bits are regarded as defining the address of a full memory location. This memory location may be the source for a data word, half word or byte to be processed in accordance with the particular operation as defined in the OP field, or the memory location may be the destination of a word, half word or byte.

It is significant that the address for an operand in the memory is identified in an instruction word only with regard to a full word address location. The meaning of this is the following. It was said above that basically words are stored in the memory in a 32-bit format, whereby thirty-two storage cells in the memory define a memory location to the word level. Each such memory location is associated with an address, and within the system described there are available altogether $2^{17}$ different addresses for designation within this addressing continuum as definable by seventeen bits. Any 17-bit address code thus defines a particular memory location to the word level. Thereby all thirty-two cells in the particular storage location are addressed.

As was mentioned above, not all data are organized in the full word format. For many purposes it would constitute a considerable waste of the available storage space in the computer memory, if all data were attempted to be handled on a 32-bit format level. For this reason, some operations are carried out to the half-word level, and still others are carried out to the byte level. The several operations here are distinguished by different types of operation codes in the OP field of an instruction word. Thus, for example, adding involving a full word, a half-word or a byte, will be defined by different operation codes (OP field of the instruction word, see FIGURE 3).

Since, as was stated above, the memory locations are addressable by a word address as it is listed in an instruction word, all addressing as controlled by and through the addressing number in an instruction word operates only to the word level. It will thus be necessary to distinguish further among the two half words in one memory location and among the four bytes in any one memory location for those cases in which respectively half-word or byte operations are called for by the operate code. In the inventive system this distinction is made external to the memory in the processing portion of the computer. It would be, of course, possible to organize a memory into a byte addressable system, but this is cumbersome, as it requires either an extension of the word format, or, at a given format, it reduces the number of available storage locations addressable to the word level. Moreover, the full word is the type of information used the most so that the memory addressing system is designed with respect to this predominant case. For this reason the processing unit is being used to distinguish among the two half words or the four bytes in a memory location.

Indexing, in general, is the method to modify an address to arrive at a different address. Here then the address code is interpreted as a true number, and a selectible number is added thereto or subtracted therefrom to arrive at a different number which then is interpreted as a different address to be used in lieu of the original address code. For reasons of proper generalization and operational versatility, indexing must always be provided for in a computer. The inventive indexing system now uses the process of indexing to accomplish the conventional indexing operation as well as to address or, better, to select particular half words or bytes out of the full word held in a memory address. This will be developed in some detail.

An address as it appears in the seventeen bit address field of an instruction word may, for example, be (0 1 0 1 . . . 1 0 0 1 1)

This seventeen bit number can, however, be written as an eighteen bit addressing number having a concatenated low order zero bit.

(0 1 0 1 . . . 1 0 0 1 1 0)

or as a nineteen bit addressing number with two low order zero bits (0 1 0 1 . . . 1 0 0 1 1 0 0)

The first of these two latter numbers is an eighteen bit integer defining a half word address, which, for example, may be the half word occupying the sixteen high order bit positions of the same word address considered here by way of representative example. The last one of the numbers given is a nineteen bit integer which can be construed as a byte address, referring, for example, to the eight high order bit positions or storage cells still in the same word address or address location.

It thus follows that the other half word address can be identified by (0 1 0 1 . . . 1 0 0 1 1 1)

and the three other byte addresses can be identified by (0 1 0 1 . . . 1 0 0 1 1 0 1)
(0 1 0 1 . . . 1 0 0 1 1 1 0)
(0 1 0 1 . . . 1 0 0 1 1 1 1)

Thus, the seventeen bits of a word address implicitly includes an eighteen bit half word address or a nineteen bit byte address, and in order to make all half words and all bytes distinguishable, digits are added (in the true meaning of the word) to be taken from an indexing register as an indexing integer. Thus, there is involved a two-step process. First a regular address may be subjected to a modified interpretation to provide for the possibility of concatenating one or two low order bits so as to extend the addressable continuum. Second, the value of these low order bits must be determined or provided for, and these low order bits are added to the regular addressing number by way of indexing.

Since the operate codes are selected to distinguish between word, half word and byte operations, the expansion of the addressing continuum is controlled by the particular type of operate code that accompanies the address code in an instruction word. If the operate code in the OP field associated with an address in an instruction word is of the type calling for processing of a full word, nothing further needs to be done, nor is any change necessary in the interpretation of the word address. However, conventional indexing may still occur when required.

Now let us assume that in a particular instruction word the operate code calls for half word operation. Of course, the operate code itself does not have to distinguish among the different half words. It simply sets forth the requirement that this particular operation as defined by a particular code is a half word operation involving only one of the two half words, stored in the operand address location.

Without further manipulation the concurrently presented word address in the address field of the instruction word is then interpreted as the half word location occupying the bit position 0 through 15, i.e., the expansion of the addressing continuum results in an implied concatenation of a low order zero bit. If, however, the other half of that location is involved, then a "one" has to be added to the low order zero bit of this eighteen bit half word address as it is impliedly furnished by the seventeen bit word address in the instruction word for a half word operation. This "one" bit is an indexing number.

If the operate code of an instruction word calls for a byte type instruction, then the seventeen bit word address in the address field is interpreted as a nineteen bit byte address and defines actually the byte within that particular word location, occupying the bit positions 0 through 7 therein. If any of the three other byte locations is to be used then the integer 1, 2 or 3 (decimal) or (01); (10) or (11) is to be added by way of indexing to the nineteen bit type address impliedly included in the seventeen bit word address provided in the instruction word.

Thus, indexing in accordance with the present invention provides for a supplementation of a word address in order to distinguish among the several half words or bytes and particularly to provide for addressing of either one of the two half words or of one of the four bytes, as the case may be. It is repeated, however, that the memory is not addressed to any level other than the full word level, so that the seventeen bit word address retains its exclusive meaning for the memory. The processor, however, sets up three different addressing continua for processing and respectively having 17, 18 and 19 bits. Within each addressing continuum indexing is possible to arrive at both, a different operand address and a particular intralocation address within this different operand address.

Since indexing will not be used exclusively for purposes of half word and byte distinction but also for address modifications in general, we obtain this result. For example, for a half word operation, a zero bit is concatenated to the word addressing number of the instruction word so that any address related to this particular operation can be interpreted as half word address. By adding any integer to that eighteen bit number one can arrive at (a) a different word address (seventeen bits) and (b) at a particular low order bit then distinguishing between the two half word addresses of the new word address. The memory addressing system 11 still "sees" only the seventeen bits of the new word address, the processor "sees" the eighteenth bit to provide for the half word distinction.

Similarly, a byte type operation defines a nineteen bit type addressing continuum. Indexing permits adding of any integer to that nineteen bit number. The memory addressing system 11 then "sees" only the seventeen high order bits as memory addressing number, and the processor uses the eighteenth and nineteenth bits to distinguish among the four bytes.

These preliminary remarks serve to emphasize that indexing in accordance with the present invention lends itself with advantage to the construction of half word and byte addressses proper. We shall now proceed to the portion of FIGURE 1 which controls this indexing operation. Specifically, these operations will ensue when an instruction word is in the D-register, with the corresponding OP-field being in the OP register.

There is provided a detecting network designated with reference number 16 which is connected to a portion of the output side of the D-register. Detector 16 is connected to monitor the twelfth, thirteenth and fourteenth bit positions of a word when held in the D register provided it is an instruction word. It will be recalled that these bit positions of an instruction word define indexing. Particularly, they define an index register, and it will also be recalled that three 0's in these three bit positions is an indication, that the particular instruction is to be executed without indexing. Thus, the detector 16 monitors whether or not indexing is to be had.

If not all bits of the X-field are zero, then detector 16 produces an enabling signal to a first output channel, 161. If all bits of the X-field of an instruction word are zero, this enabling signal is not produced, but an enabling signal is produced in a second output line 162, to indicate—no indexing. The timing and phasing unit $\phi$ controls the effectiveness of these signals. The bits in the register stages receiving bits "12, 13 and 14" represent the X-field only when an instruction word is in the D-register.

Next, there is provided a general function processor 20. This processor 20 is of a nature which does not require elaboration. Its principal function is to perform logic and/or arithmetic type operations on data applied to it. It includes, and this is of primary interest here, a parallel adder 21 conceivably of conventional design. Processor 20 including adder 21 has a first set of input channels 210, which has thirty-two channels, one channel per bit, connected to the output side of the D-register. Thus, channel 210 may apply an operand held in the D-register to the adder 21 in order to serve as one number input for the adder. The other number to be added is applied to processor 20, adder 21, via a thirty-two bit line 211 and from a register called A-register. This adder 21 is used for arithmetic operations proper such as the adding of numerals as part of the computing program to be executed. In addition the adder is also used for indexing. This comes into play when the D register holds an instruction word.

Immediate participants (augend) for this latter, indexing type adding operation, of course, are only the bits occupying the fifteenth through thirty-first bit positions of an instruction word, i.e., of the word address, held in the appropriate stages of the D-register. This adding operation using the addressing number of the instruction word as augend takes place only if there is to be indexing. Thus, a portion of the channel 210 and including seventeen subchannels feed seventeen bits from the D-register to the adder. This transfer is governed from the index control or detector 16. The enabling signal output in line 161 of a detector 16 will open up seventeen lines of channels 210 for the indexing operation.

The remaining fifteen channels which normally connect the D-register to the adder 21 of function generator 20 may be kept closed for the indexing operation. While this is not essential, it may be desirable, in order to avoid overflow indications which would influence the operating program. Thus, only a seventeen bit augend is to be applied to the adder.

The actual opening of this portion of channel 210 will be phased additionally from the timing and phasing unit $\phi$, which is not important as far as the inventive concept is concerned. The operative connection of the stages of the D register to the adder for purposes of indexing is allowed only during a particular instant having a definite time relation to the time that an instruction word was set into the D register. At no other time is detector 16 permitted to block some or all of channel 210.

Should the detector 16 discover that there is no indexing, then the alternative control channel 162 is activated to provide an enabling signal for opening up a channel 212. This channel 212 connects the stages of the D register holding the address field of an instruction word, to a program address register, also called the P register. This P register has seventeen stages, i.e., as many stages as are needed to hold an address code or addressing number. Thus, in case there is no indexing the address field when held in the D register is set directly into the P register through the then opened channel 212.

The output side of the P register connects to the memory access bus 110 which controls and serves as input for the memory access control device 11. The P register is always effective as memory address source. Thus, alternatively, the P register will receive an indexed address from the output side of the adder 21. In other words, the P register is the destination for a number of resulting from indexing.

The addend numbers used for indexing are held in the register memory 12 which can also be described as fast access memory. This fast memory 12 comprises a plurality of registers. Each register has as many stages as bits in a word. This is the general rule, because the registers of unit 12 do not exclusively serve as storage elements for indexing integers. The alternative use of these registers, however, is of no interest here. Thus, as far as indexing is concerned, the registers of unit 12 must have at least as many stages as the highest permissible indexing integer has digits in binary expansion, which is nineteen in view of the nineteen bit byte addressing continuum provided for.

Each register of memory 12 must be addressable specifically. The total number of registers used is arbitrary. It is apparent that if there are only seven registers, or if there are only seven registers for indexing purposes, no further means are needed to address the registers, as the 3-bit X-field fully defines seven numbers assignable as addresses for seven index registers. If, however, there are more than seven registers to be used for indexing a further distinction is needed.

The distinction among the registers will be described here only as far as necessary. Further details are described in copending application Ser. No. 572,835, filed Aug. 16. 1966 (supra). Briefly, there is provided what is called in this copending application a block pointer register, called here, the PR register, which holds a particular code or number in a particular format. The number code held at any time in the PR register "points to" and identifies a group of registers among the plurality of registers of register memory 12. Different groups are identified at different times by different codes in the register PR. Each group so identified or pointed to includes seven registers usable as index registers. Thus, the code held in the PR register together with the code of the X field of an instruction word when set into the D-register unambiguously defines a particular index register holding the integer in binary expansion to be used for indexing.

There is a channel 121 which provides the three bits from an X-field of an instruction word when held in the D-register. There is a channel 122 which provides the pointing code from the PR register and in as many lines as are needed. This pointing code identifies the particular register group in which the desired index register is included. The two channels 121 and 122 together provide an addressing signal code to a fast memory access bus 123, and this bus 123 leads to the fast memory 12 for access to the particular register as defined by the code held in channel bus 123.

The addressed one of the registers in the fast access register memory 12 applies its content to the fast memory data output bus 124. The data bus 124 is operatively connected to an alignment control 17 the function of which will be described more fully below. Briefly, the alignment distributor 17 determines how the number applies to bus 124, if it is the indexing number, is to be distributed into a pair of registers designated as A and PA registers.

The A register is the operative accumulator register which was briefly introduced above. This A register has its output connected to a channel 211 and serves as the second input for the processor 20, and for many cases, including indexing, as a second input to the adder 21. Thus, for adding operations the A-register holds the addend, after the latter has been fetched from the register memory.

For indexing, the number set into the A-register is added to the addressing number held in the fifteenth through thirty-first bit positions in the D register when the D register holds an instruction word. The resulting, i.e., indexed address is applied to a data output bus 25, having a branch 213 connected to the input side of the P register. This branch is enabled only in case of indexing.

The A, P and D registers involved in indexing do not consider byte and half word addresses, because the output of the P register feeds the access control 11 and the latter operates on full word address locations only without half word or byte distinction. Thus, the number held in the A register alone when added to the seventeen bit address number held in the D-register, is a word address modifier.

The byte and half word selection is controlled from the PA register, which is the second one of the two registers coupled to bus 124. The PA register has only two stages and these two stages are connected to the alignment control 17 when transmitting an integer from the index register via the fast memory output bus 124. Thus, the alignment control 17 sets part of the number drawn from an addressed register in memory 12, as word address modifier into the A-register, and a part of this number is set into the PA register. The distribution of the bits forming this number into A and PA registers is controlled by the alignment control device 17 operating in response to the type of operate instruction held in the OP register. The content of the PA-register is monitored by a decoder 18 providing control signals for purposes of byte and half word distinction.

The operating code of an instruction word when held in the OP register is decoded by a decoder 19 to provide for the particular operation called for. This is of no interest here. It is, however, of interest that the decoder recognizes the instruction type, full word, half word or byte, and this recognition is reflected into the alignment control 17 to govern the distribution of the indexing integer. There is still another type instruction called double word, which requires the participation of two full word addresses. As will be described below, the operand addresses of such double word type instructions can readily be indexed within the scheme considered here. This desired indexing operation will now be outlined with reference to the remaining portions of FIGURE 1.

Assuming an instant in which an instruction word has been set into the D register, this instruction word may have the format as it is shown in FIGURE 3. It can thus be seen that the stages of the D register holding the fifteenth through thirty-first bit positions of the instruction word will hold an address to the word level. As was outlined above, this particular address can also be construed as a half word address having 18-bits and the eighteenth bit is understood to be zero, thereby defining one of the half words in the full word address location. Or the same address can still be considered to constitute a byte address, with two low order bits of bit values zero being impliedly concatenated to the seventeen bits actually furnished, and these implied zeros define the first one byte in the word addressed.

The interpretation of this address as a word, half-word or byte address is solely dependent upon the particular type of operating code concurrently held in the OP register. Whenever there is a byte or half word instruction present, the PA register may modify the implied byte or half word address within the word address, and this modification requires indexing.

Assuming that the operate code calls for a byte operation, then the seventeen bit address code held in the D-register may be insufficient to define the byte address, unless the byte in the bit positions 0 through 7 of the particular word location as defined by the 17-bit address field then held in the D-register is the one to be used for the byte operation. If this is the case, then concurrently thereto the X-field of the instruction word presently held in the D-register will hold three 0's; no indexing is to take place. Thus, no modifier bits are loaded into the PA register.

The also otherwise unmodified word address filed is passed through the channel 212 into the P register. As was stated above only seventeen bits are needed for memory addressing because access control 11 operates to the word level. It shall be further assumed that the particular operation code calls for withdrawal of a number having at most 8-bits and held in the particular memory location. Thus, a full word is loaded in the M and C registers. The decoders 18 and 19 provide respectively first and second control signals to the selector gate 16, to allow the transfer of one byte of data in the C-register to the 8 low order bit positions in the D-register, while preventing the transfer to the D-register of the other three bytes in the C-register. A signal from operate decoder 19 serves to interpret the particular code of the PA register as a byte distinguishing signal, in case of a byte operation and the decoder 19 controls which particular byte is to be transferred from the C register to the D register. Subsequently, the D register will hold the particular byte called for, and the OP register decoder 19 will then instigate the particular operation called for.

Assuming a different byte was intended to be subjected to this operation, having the same OP-code. Then indexing is required. The PA register without indexing always holds only 0's and thereby impliedly defines one particular byte (or one particular half word as the case may be). Assuming the byte operation is to use the byte held in positions 16 through 23 of the particular word address as defined by the 17-bit address code held first in the D register. For this case, the instruction word will include in its X-field the code for a particular index register. The detector 16 thus discovers that there is to be indexing so that channel 212 will not be opened.

Accordingly the channel 121 receives the X code defining one of the seven registers in fast memory 12 and pertaining to the group of registers identified by the code currently held in the PR register. The code provided in channel 121 together with the code provided in channel 122 forms a fast memory address applied through channel 123 to the register memory 12, and the desired register is accessed. The integer held in this register is applied to the fast memory data bus 124. The distributor 17 responds to the fact that there is a byte type operation, and it interprets the particular indexing number as a number which has to be loaded in a particular manner into the A register as expanded by the PA register.

If the word address proper is not to be changed, the index register will contain a number between 0 and 3, hence only the PA register will receive non-zero bits. The A register will not receive any number and this is per se an indication that the address as it is held in the D register at that time has a word address which is not to be changed. Indexing is used now only for purposes of designating a particular byte address in that particular word address without changing the word address itself. It is emphasized that this designation of a byte address is not a matter of control circuit operations but determined solely by the integer as distributed by the device 17. If the word address is not to be changed, then the indexing integer must have a value so that the A register does not receive any digits.

As it may be inconvenient to distinguish between normal indexing and the indexing which simply serves to arrive at a particular byte address within the unindexed word address, the adder 21 receives now the 17-bit address number through the channel 210 and to this is added to the number 0 as held in the A register so that the adder arrives at the same word address, and this address is applied to channel 213 to be passed into the P register. The particular word address is then accessed through channel 110 and the access control 11 as before.

The PA register now may hold the number 1 defining the byte location in the word address location of interest, and the decoder 18 monitoring the number held in the PA register will operate on a different channel in the transmission and electing device 15, so that a different byte, in this case now the bits in the sixteenth through twenty-third bit positions held in the C register, are being passed to the D-register for further processing.

The third possibility is that indexing will result in an entirely different word address and in a particular byte address therein. After access to the particular index register defined by the X-field of the instruction word, a particular number will partially be set into the A register, and the two low order bits of that number are passed by the distributor 17 into the PA register. The PA register again is used subsequently to control via decoder 18 the distributing device 15, while the number held in the A register proper is added to the address held in the fifteenth through thirty-first bit positions of the number held in the D-register, and this word address number newly arrived at is fed to the P register. The respective memory location is accessed, its content passed through the M register to the C-register, and by operation of selector 15, the proper byte is selected for further processing.

It will be necessary to describe more fully the alignment control 17 and the selective transmission device 15. The discussion above was based primarily on the problem how to render half words and bytes addressable as the memory locations are organized to the word level only. The particular organization of elements involved in the process, however, will now be considered from a different aspect and includes consideration of indexing in general and from a different viewpoint. Here we must consider this: As stated above, for indexing the portion of a number drawn from an index register and set into the A-register is used to modify the word address, and the portion set into the PA-register provides for byte or half word distinction. It shall now be explained why it is meaningful that the two different portions actually can be regarded as a single number. To state it differently, it shall be explained why the same number can be used for indexing of byte, half word, word or double word addresses.

Indexing is usually, or in many cases, used as a means for systematically varying the operands which a program is to use. It often occurs within a program that for a particular program different sets of numbers or different sub-programs are to be used, and the selection of the particular set may be dependent upon the outcome of previous calculations or the selection may depend on externally monitored operating conditions or on any other conceivable reason. All of the number operands and/or all of the sub-programs which may have to be used are stored in different locations.

There is a first set of locations holding, for example, one set of number operands. The addressing numbers for the locations of a second set of numbers conceivably to be used in the alternative are arrived at by adding a particular number (index integer) to the several addressing numbers of the first set of locations; the addressing numbers of the locations for the other sets of operands are arrived at by adding different indexing numbers to the addressing numbers of the first set. Depending upon the value of the index integer, one or the other of these sets will be used. In this case one has thus a program with a basic set of addressing numbers holding one set of numbers, and the variations are produced in that instead of accessing this basic set of locations other locations are calculated by indexing. The particular indexing number numerically determines which particular set is to be used, and the computer will have calculated or otherwise determined the numerical value for the indexing integer to be used.

The inventive system combines the indexing method required in general to calculate new addressing numbers with the formation of in-word, byte or half word addresses, and the latter case of mere byte or half word address formations are merely special cases for the general principle of extracting specific numbers from specific memory locations other than the full word location identified in the addressing field of an instruction word.

The indexing technique used here is based on the concept that the index register used in the current particular part program should contain an integer value which may be K, and which permits the accessing of the Kth item of a list of locations independent of what kind of locations are defined by the list. For example, for a byte type instruction indexing will cause access to the Kth byte in the nineteen bit byte addressing continuum while a full word instruction which refers to the same index register will obtain the Kth word of the list. The alignment control 17 serves as an adapter so that the number K is interpreted as integer in relation to the list, i.e., whether there is full word, half word or byte address indexing. The number K which is the displacement drawn from the index register, is aligned so that it is treated as an integer relative to the type of operand address which the OP code indicates is to be used for this operation. If it is a byte type operation, the two low order bits of the number K (in binary expansion) will be set into the PA register, and the remaining bits of higher order are set into the A register. As far as the relevant word address number is concerned, the number $K/4$ is added as integer to the word address to be indexed, and the remainder defines the byte.

For half word operation the expansion of the addressing number to be indexed to an eighteen bit half-word address means that the number $K/2$ is added to the corresponding word address, the remainder then defining the particular half word in the thus indexed word address. For full word operation, the number K is added to the word address and the PA-register receives nothing. At this point, it shall be explained that double word operations alluded to above only briefly, fall readily into this scheme of indexing. A double word operation is of the type in which two full word operands represent a single number, to be subjected to one operation, whereby, however, the two portions are handled consecutively. Such double lengths number words are stored, or are to be stored in two locations having consecutive addresses, but only one of these addresses is listed as operand address. If one selects for such address only even numbers, then the least significant bit of an address in a double word instruction must be a zero. Likewise, indexing of such an addressing number must not break this scheme so that the indexing integer must be an even number. To follow the scheme outlined above, the Kth item in a list of double word operand addresses will thus require indexing with the number 2K. Of course, the PA register does not receive any digits in this case.

Figure 4:
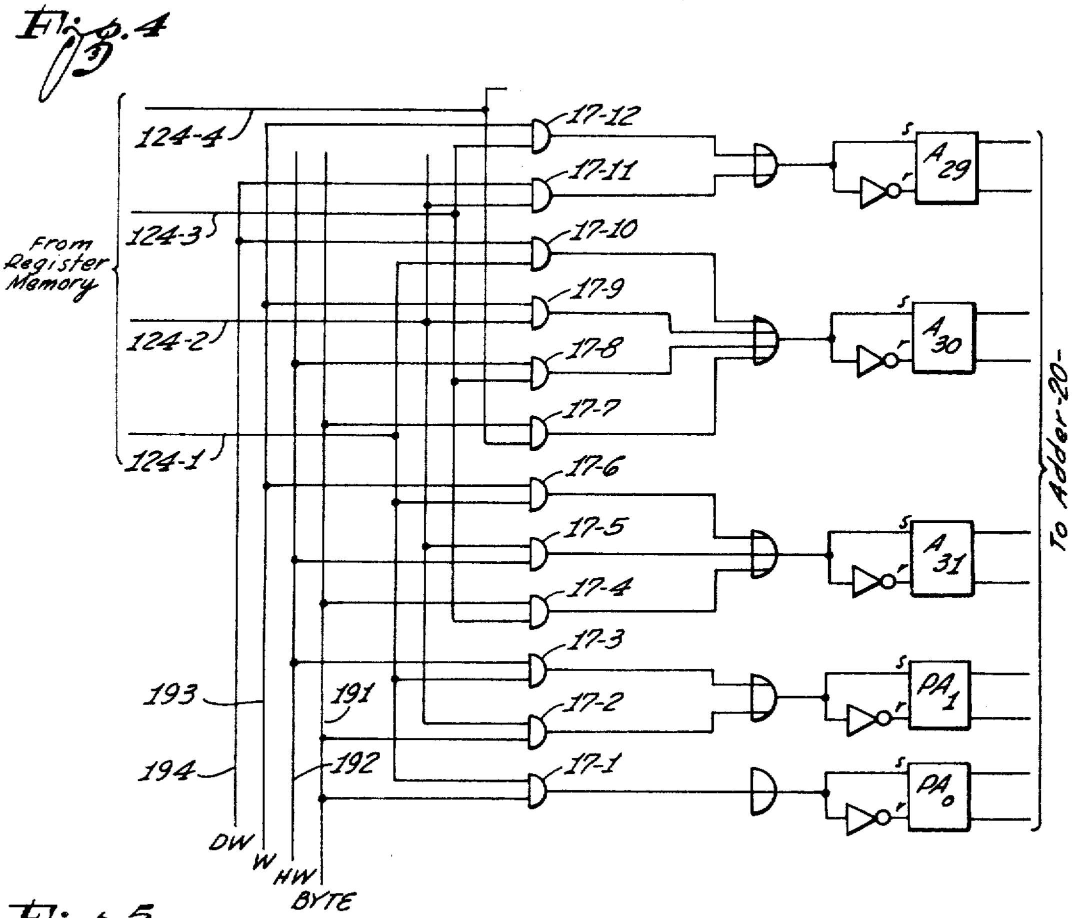
FIGURE 4 illustrates somewhat schematically a logic diagram for the transfer of an indexing number from its storage place to the place of its use and as shown more generally in FIGURE 1.

It thus appears, that depending upon the type of operation the index integer used as 2K, K, $K/2$, or $K/4$. The alignment control 17 provides for this particular operation to be explained now with reference to FIGURE 4. FIGURE 4 illustrates a portion of the connection of the fast memory bus 124 to the A register as expanded by the PA register as far as transfer of indexing integers is concerned. The first three stages of the A register are shown and designated $A_{31}$, $A_{30}$, and $A_{29}$. Normally, they hold the three least significant bits of any word set into the A register for purposes of arithmetic operations. The stages $PA_0$ and $PA_1$ define the PA register.

Each one of these register flip-flop stages has a set and a reset input side respectively denoted with *s* and *r*, and each of these flip-flop stages has output lines accordingly to define true and false switching states, thereby to define bit values 1 and 0 respectively. Additionally, the flip-flops may receive clocking and other gating inputs which are of no concern here except as described below.

The input side of this particular circuit network as far as shown in FIGURE 4 has four signal input lines. These lines pertain to the fast memory output bus 124, and herein the lines 124–1 denote the line which always receives the least significant bit from any register of the fast memory 12 that has been addressed at any particular instant for purposes of applying its number to the fast memory output bus 124. Accordingly, the line 124–2 receives the second least significant bit. The lines 124–3 and 124—4 respectively receive the third and the fourth least significant bits of such a number word of the addressed memory register. It will be understood that there are twenty-eight additional such lines for the bits of respective higher orders, to altogether define the thirty-two data lines.

The next set of inputs shown in FIGURE 4 are control lines 191, 192, 193 and 194. These lines are connected to the operate code decoder 19 as shown in FIGURE 1. As was stated above this decoder 19 controls the particular type of operation to be performed which is uniquely associated with the particular type of operate code held currently in the OP register for purposes of executing the particular instruction. As was mentioned also these operate codes are classified, in general, as defining either word type operations, half word, byte or double word type operations. In either one of these cases the operate decoder 19 provides a particular control and gating signal associated with the particular class or type of operation.

The line 191 thus receives an enabling signal in case the OP register shows a byte type of operation. The line 192 receives an enabling signal in case the operate decoder 19 detects a half word type operation to be in the OP register. The line 193 accordingly receives an enabling signal for a word type operation, and line 194 receives an enabling signal for the double word type operation.

These control lines 191 to 194 control the distribution of the bits or digits of an integer from fast memory bus 124, into the A register as extended by the PA register. More particularly, the digits of an indexing integer are aligned to redefine their position value, and to thereby accomplish a division by 2 or 4 for the half word and byte case respectively, and a multiplication by 2 for the double word case. This alignment is accomplished by a number of gates 17–1, 17–2, etc.

Consider first the case of indexing pursuant to a full word type operation, the transfer from the bus 124 to the A-register is the same as is the normal transfer of words from any register of memory register 12 to the A-register for purposes other than indexing. In case of a word operation the line 193 receives an enabling signal from the decoder 19. It can be seen that the flip-flops $PA_0$ and $PA_1$ will not receive any input. The least significant bit held in line 124–1 is passed through the gate 17–6 to the flip-flop $A_{31}$; the second least significant bit is passed from line 124–2 into the flip-flop $A_{30}$ via open gate 17–9 for a full word type operation. The third least significant bit in line 124–3 is passed into the stage $A_{29}$ of the A register via gate 17–2 the fourth least significant bit will be passed into a stage $A_{28}$ (not shown), and so forth.

In case an enabling signal is passed into the line 191 indicative of the fact that a byte operation is to be executed, gates 17–1, 17–2, 17–4 and 17–7 receive enabling signals. The gates 17–1, 17–2, 17–4 and 17–7 are respectively connected to the signal lines 124–1, 124–2, 124–3, 124–4. The gate 17–1 passes the bit it receives from the least significant bit line 124–1, into the flip-flop $PA_0$ setting or resetting the flip-flop as the case may be. The gate 17–2 passes the bit in line 124–2, which is the second least significant bit, into the flip-flop $PA_1$. The gate 17–4 passes the bit in line 124–3, which is the third least significant bit, into the flip-flop $A_{31}$, and the gate 17–7 passes the fourth least significant bit in line 124–4 as input signal to the flip-flop $A_{30}$. Thus this distribution is a dvision by four of the number applied to the channel 124, whereby the stages $A_{31}$, $A_{30}$ and the respective higher stages of the A-register receive, so to speak the integral value of the quotient $K/4$, and the two flip-flop stages $PA_0$ and $PA_1$ of the PA register receive the remainder.

Consider now that the current operation is a half word one. In this case then the line 192 is enabled, and it can be seen that now the gates 17–3, 17–5 and 17–8 are opened. It can be seen further, that no input is applied to the flip-flop $PA_0$ which, therefore, remains in the reset state. The least significant bit from the line 124–1 is applied to the flip-flop $PA_1$. The second least significant bit is applied to the flip-flop $A_{31}$. The third least significant bit is applied to the flip-flop $A_{30}$ and the fourth least significant bit will be applied to the flip-flop $A_{29}$ which is not illustrated but which follows the same logical order. Thus, the same integer is divided by two through the alignment, and the remainder bit is set into flip-flop $PA_1$.

In case of a double word operation the index integer is to be multiplied by 2, which means that the least significant bit will be passed from the line 124–1 into the flip-flop $A_{30}$ through the gate 17–10. The second least significant bit will be passed into the flip-flop $A_{29}$, the third significant bit will be passed into a flip-flop $A_{28}$, etc.

It can thus be seen that the network 17 illustrated in parts in FIGURE 4 provides for a proper alignment of the index integer as it is being passed into the A register extended by the PA register. As was explained above, the A register and the D register in FIGURE 1 are both coupled to the adder 21 to provide the two numbers to be added. The adding process is representatively explained now with reference to FIGURE 6.

Figures 6, 7:
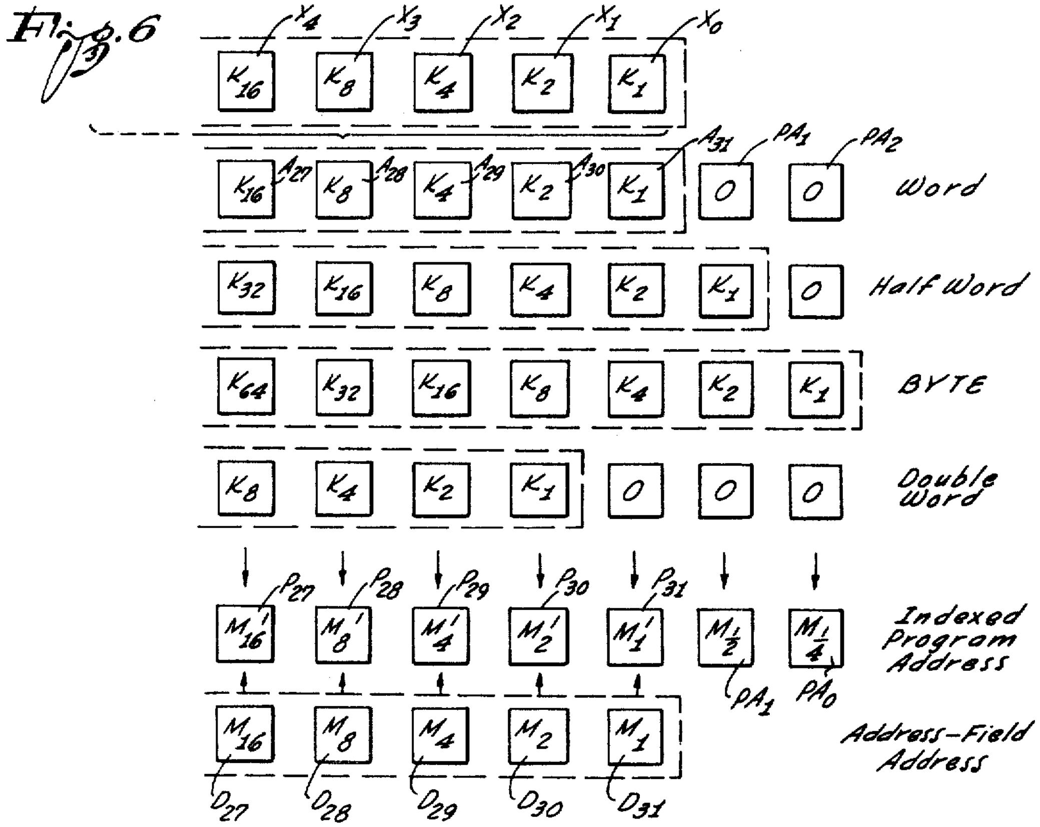
FIGURE 6 illustrates schematically the operation of the inventive indexing process.
FIGURE 7 illustrates a numerical example of the organization of memory locations addressable by using the inventive system.

FIGURE 6 illustrates the alignment for the index integer held in the fast memory register identified by the X-field of the same instruction word which includes a memory address defined by a number held in the D register. This full memory address is held in the stages $D_{31}$, $D_{30}$, $D_{29}$, $D_{28}$, $D_{27}$, etc. (see bottom row in FIGURE 6). The stage $D_{31}$ will, therefore, hold the bit of lowest order pertaining to a number which defines a memory address as it appears as part of the instruction word held in the D register. This low order bit is symbolically indicated in FIGURE 6 as $M_1$. Accordingly, there is a bit $M_2$ having a binary position value 2, if we construe the memory address as a number in binary expansion. It is apparent that the stages $D_{29}$, $D_{28}$, and $D_{27}$ respectively hold the binary bits $M_4$, $M_8$ and $M_{16}$ designated in accordance with their respective position values 4, 8 and 16 in binary expansion.

The top row in FIGURE 6 illustrates stages $X_0$, $X_1$, $X_2$, $X_3$, $X_4$, etc. which can be construed as index register states of ascending order whereby the stage $X_0$ holds the bit of the lowest order which defines the integer used for indexing, and again we consider the integer as being held in binary expansion in the index register. Accordingly, this integer will include bits $K_2$, $K_4$, $K_8$, $K_{16}$, etc. with the subscript denoting the position value of the digits in binary expansion respectively held in the stages $X_1$, $X_2$, $X_3$, $X_4$, etc. The stages $X_0$, $X_1$, etc. and $D_{31}$, $D_{30}$, $D_{29}$, etc. are illustrated in FIGURE 6 in vertical alignment with regard to stages having corresponding position values as to the digits held therein. Thus, the bits $K_1$ and $M_1$ are vertically aligned, so are the bits $K_2$ and $M_2$; $K_4$ and $M_4$; $K_8$ and $M_8$, etc.

For straight forward indexing to the word level, no half word, byte or double word operation being involved, this order of alignment is not disturbed. The bits are set from the fast memory bus 124 into the A register in the same order as are all other numbers (expressed in full words) in bus 124, and it can be seen that this is the same order as was indicated in FIGURE 4. In particular the bit $K_1$ is set into stage $A_{31}$, bit $K_2$ in stage $A_{30}$, bit $K_4$ in stage $A_{29}$, etc.

For indexing the adder now performs an addition by adding the contents of the A and D register in order to calculate a new memory address, having bits designated $M_1'$, $M_2'$, $M_4'$ . . . . Thus, by normal adding operation a new program address will be formed, and this is shown in the penultimate row in FIGURE 6, whereby subsequent to the addition the stage $P_{31}$ of the program register P receives the bit of the actual operand address and designated with $M_1'$ which has been formed by the addition of the bits $M_1$ and $K_1$. The stage $P_{30}$ of the program register P will receive a resulting address bit designated $M_2'$ formed from the bits $K_2$ and $M_2$ and the carry bit which resulted from the addition which formed $M_1'$. Accordingly, the stage $P_{29}$ will receive a resulting address bit resulting from the addition of bits $K_4$ and $M_4$ with a carry bit operating as modifier having resulted from the addition that formed $M_2'$. This is straight forward binary addition and does not require elaboration.

The content of the PA register, i.e., the bits held in the stages $PA_0$ and $PA_1$ are necessarily zero. The address formed by the addition is applied to the memory address bus 110.

Now consider the half word operation involving the same index register. The distributor 17 now sets the individual bits of the same index integer into the A register but in a different arrangement, called downward alignment. The stage $PA_1$ of the PA register receives the low order bit $K_1$. Stage $A_{31}$ receives $K_2$. Stage $A_{30}$ receives $K_4$, etc. This alignment is shown in the third row of FIGURE 6 and it is the transfer controlled by the gates 17–3, 17–5, 17–8, etc. in FIGURE 4. Now the addition is performed. The address bit $M_1'$ is formed by adding the bit $M_1$ in stage $D_{31}$ to the bit $K_2$. The address bit $M_2'$ results from adding bit $M_2$ to bit $K_4$, plus the carry bit that may have been formed during the formation of bit $M_1'$. The bit $M_4'$ results from the addition of the bits $M_4$ and $K_8$ modified with the carry bit that might have resulted during the formation of the bit $M_2'$ etc.

Therefore, the number formed and set to the P register is a number which resulted from the addressing number in the address field as held in the D-register and by adding thereto the value $K/2$ in binary expansion, because the transfer of the integer K from the index register in the fast memory to the A register was made in a manner which is the equivalent of a binary division by 2. The PA register, particularly stage $PA_1$ now holds the bit designated as $M_{1/2}$, and having the value of bit $K_1$. This particular bit defines the particular half word location in the memory location as defined by the bits $M_1'$, $M_2'$, $M_4'$ etc. The PA register stage $PA_0$ has a zero bit.

For byte type operations, the bit $K_1$ of bus 124 (line 124–1 in FIGURE 4) is set into the stage $PA_0$ as bit $M_{1/4}$. Bit $K_2$ is set into the stage $PA_1$, the bit $K_4$ is set into the stage $A_{31}$; the bit $K_8$ is set into the stage $A_{30}$, etc. Upon indexing, the contents of A and D registers are added. The bit $M_1'$ now is bit $M_1$ plus bit $K_4$. Bit $M_2'$ results from the addition of bit $M_2$ and $M_8$ plus the carry bit that may have resulted during the formation of bit $M_1'$, etc. The bits $M_{1/4}$ and $M_{1/2}$ held in the PA register are respectively the two bits $K_1$ and $K_2$ and define the particular byte position within the address location of the memory defined by the code $M_1'$, $M_2'$, $M_4'$, $M_8'$ etc.

In the case of a double word operation the situation is handled in an analogous manner. Again, we have only zeros in the PA register as no in-memory location place assignment is necessary. The indexing integer is set into the A register, in that the bit $K_1$ is set into stage $A_{30}$, the bit $K_2$ is in stage $A_{29}$, bit $K_4$ is in stage $A_{28}$, etc. and the stage $A_{31}$ receives a zero. This is the equivalent of multiplying the indexing integer by 2. Upon indexing by adding, the stage $P_{31}$ of the program register P receives bit $M_1$ because only the value zero is being added thereto. The bit in stage $P_{30}$ and designated $M_2'$ is formed by additively combining $M_2$ and $K_1$; bit $M_4'$ is formed by additively combining $M_4$, $K_2$ and the carry bit resulting from the formation of $M_2'$ and so forth.

The aforedescribed scheme will be further illustrated by way of a numerical example. Reference is made again to the representative example for an addressing number of a full word address which was given above:

(0 1 0 1 . . . 1 0 0 1 1)

This is a full word address having seventeen binary digits. As half word address, it is construed as an $(0\,1\,0\,1\,\ldots\,1\,0\,0\,1\,1\,\underline{0})$ as byte address it is construed as a nineteen digit number $(0\,1\,0\,1\,\ldots\,1\,0\,0\,1\,1\,\underline{0}\,\underline{0})$ The impliedly concatenated digits having been underlined. For each situation, the number with seventeen, eighteen or nineteen digits, is treated as an integer forming the base value of a list of addresses. To this base value the indexing integral number $\underline{K}$ is added. Let this number K be 3 (=1, 1), then the following word, half word, byte and double word addresses will be obtained:

| | |
|---|---|
| . . . 1 0 1 1 0) | (word) |
| . . . 1 0 1 0 0 1) | (half word) |
| . . . 1 0 0 1 1 1 1) | (byte) |
| . . . 1 1 0 0 1) | (double word) |

One can see, that for the double word, word and half word cases different word addresses are arrived at, but not for the byte address. This is due solely to the particular indexing integer used. It will be appreciated, that the least significant bit in the new half word address, and the two low order bits in the byte address, are those held in the PA register and, as far as their being a part of the number K in binary expansion is concerned, these low order bits remained unaffected by the addition, as only zero was added to them.

FIGURE 7 illustrates a simple example of program addressing. FIGURE 7 shows a chart of sample program lists for several sets of data in which memory addressing numbers are written in decimal notation. The interpretation requires that half word addresses are written as –.0 and –.5, while the four possible byte addresses are denoted –.00, –.25, –.50, –.75. It may be assumed that for a certain program data are needed which comprise two full words, one byte, one half word and one double word. It may further be assumed that altogether four different sets of values are used for alternative operations to be arrived at by indexing. The addresses involved for storing of the different numbers can be organized very economically as far as required storage space in memory is concerned.

The first set, for example, comprises the word address numbers 3253, 3257, 3261.0 and 3263.00 and 3264(65). Herein the double word address as an even number impliedly includes the memory address designated by the next odd number. Now, the second set of locations will be arrived at by indexing, particularly by using the indexing integer 1 as base value. This means, that –1– is added to a word address, ½ (or 0.5) is added to half word address, 0.25 is added to a byte address and 2 is added to a double word address by operation of the alignment device 17.

Thus, upon indexing, there will result the two full word addresses 3254, 3258. Due to the particular type of indexing one arrives now at the half word address number 3261.5. This is the upper half of the word address which houses the half word of the first set of locations. For the byte address one now arrives at the address 3263.25 which means that it is identified by a code in the PA register which in binary notation is (0, 1) representative of a decimal number 0.25 as representation of a byte defining number. This new byte location of the second set of numbers includes the bit positions 8 through 15 of the same memory location which in the bit positions 0 through 7 contains the byte used in the first set. The double word, of course, is now in the locations 3266 and 3267.

The second set and the third set of addressing numbers are easily derivable from FIGURE 7, and one can see that in this particular situation there is a contiguous utilization of all available memory location. There is, of course, some interleaving as the particular word address locations 3263 contains all of the bytes for all of the four different sets. Of course, it will not be possible in all situations to use every available storage location in this matter, but skillful programming can make optimum use of the available storage space.

Figure 5:
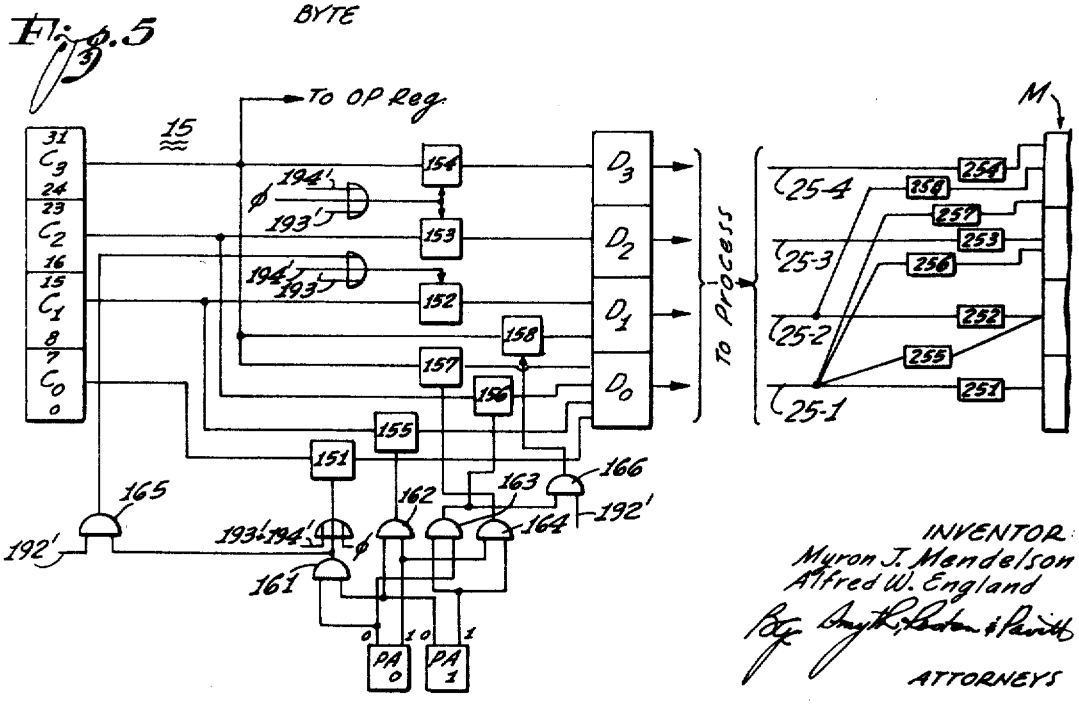
FIGURE 5 illustrates the selection of the affected portion of the content of an addressed memory location.

After having described how the indexing operation is performed in general, and how number values representative of byte and half word address within a word address are formed to be represented in the PA-register, we proceed to the description of FIGURE 5 showing how the Processing Unit uses the content of the PA register.

FIGURE 5 illustrates somewhat schematically but in greater detail how the content of the PA register controls the transfer of data from the C register to the D register. Here it will be explained particularly how the decoded content of the PA register controls the transmission channel 15 which links the C register with the D register for transfer of data withdrawn from the memory. The content of the PA register is 00, both for word and for double word operations, because, it will be recalled that double word operations are in effect automatically controlled, sequential operations concerning the two words located in succeeding memory locations withdrawn therefrom in two sequential steps. The $PA_0$ stage will necessarily be 0 in case of a half word operation, while the bit held in stage $PA_1$ defines the particular half-word position in a word or memory location. The two stages $PA_0$ and $PA_1$ are capable of defining together four different numbers, respectively associated with the four different positions a byte may have in a word location.

The control of the transfer of bytes and half words is a two-fold one. It will be recalled, that in all cases of a memory location readout the full word is always set into the C-register. Thus, the undesired half word or the undesired three bytes have to be suppressed, if a particular half word or byte is to be transferred now into the D register. Additionally, it is inconvenient to leave half words or bytes in their relative positions in the registers throughout the transfer in the processing unit. Rather it is preferred to set all bytes into, for example, the eight low order bit positions in the D register and subsequent operations proceed from there. Likewise, it is better to use only the sixteen low order positions for all half words. Moreover, such realignment of positions of bytes and half words is necessary for arithmetic operations, because if, for example, there is a parallel adding of two bytes, they must be in the same relative position as otherwise a concatenation rather than an addition would result. The selector 15 thus controls the selective transfer of bytes and half words and realigns their position.

Accordingly the transfer from the register C to the register D is one which can be described as a downward alignment. For this purpose the registers C and D are illustrated in FIGURE 5 in sections whereby the sections $C_0$ holds eight bits in the 0 through 7 bit positions, section $C_1$ holds eight bits 8 to 15, etc. The D register is accordingly symbolically split up into four sections $D_0$, $D_1$, $D_2$, and $D_3$. For normal full word operations the eight bits in the sections $C_0$ will be transferred to the section $D_0$, the eight bits in section $C_1$ will be transferred to $D_1$, those from $C_2$ into $D_2$ and those from $C_3$ into $D_3$.

The downward alignment now envisioned here has the following result. Any byte that is wanted, whether it is in section $C_0$, $C_1$, $C_2$ or $C_3$ will be set into section $D_0$. A half word that appears in sections $C_0$ and $C_1$ or in sections $C_2$ and $C_3$, is to be transmitted in either case into the two sections $D_1$ and $D_0$ respectively. The gating networks 151 through 158 provide for this selective transfer and downward alignment and suppression of unwanted portions. Each one of these gating network includes a group of eight gates, one per bit.

The gate groups 151, 152, 153 and 154 are enabled for word and double word operations, and also when an instruction word is transmitted from the C register to the D register. In these cases, no realignment nor any suppression is desired so that all four gate groups 151 through 154 have to be open.

It will be recalled, that the operate code decoder 19 furnishes signals representative of the type of operation required, byte, half word, full word or double word (see lines 191 to 194 in FIGURE 4). On the other hand, not all operations require the transfer of data from memory into the processor, but some require the reverse flow of information. The transfer from the C-register to the D-register is thus limited to those cases wherein there is a transfer from memory into the processor. It is thus presumed, that for those subclasses of instructions enabling signals are provided in lines 191′, 192′, 193′ and 194′ respectively receiving enabling signals for byte, half word, word, double word operations and involving a transfer from memory. Such operations include, for example, all arithmetic operations, output operations for external printing, recording, displaying of data, etc.

The operational signals in lines 193′ and 194′ define full word and double word operations to open gate groups 151 to 154. A phasing signal $\phi$ for instruction word transfers will enable these gate groups 151 and 154 as alternative signals to pass an instruction word completely from the C-register to the D-register.

Consider now a byte transfer. This situation will arise, in particular after an instruction word with a byte type operate code was set into the D and OP registers and to be retained in the OP register. After indexing, the addressing information for the operand is in the P and PA registers, so that thereafter the content of the D-register is expendable and may receive the operand from the memory location to be addressed. Since we presume a byte operation with transfer from memory, it is necessary to detect which byte in C register is involved for transferring it into section $D_0$. The byte is determined by the bits held in the PA-register. Thus, there are provided four byte code detectors (and gates), 161, 162, 163 and 164. In the order of the reference numerals selected they respectively are being enabled if the first, second, third and fourth byte position in the word held in the C-register is demanded. The detectors respectively enable gate groups 151, 155, 156 and 157, all having the section $D_0$ as destination or output location.

It will be recalled from the description of FIGURE 4 that the first byte occupies the positions 0 through 7 in a word location as well as in the C-register; the second byte occupies the positions 8 through 15, etc. Thus, in case of a byte type operation only a particular one of the gates or detectors 161 through 164 is enabled, and accordingly the respectively enabled byte position detector 161 through 164 feeds an enabling signal to one of the gate groups 151, 155, 156 or 157. No further gating is needed for this situation, i.e., the utilization of the byte signal in a line 191′ is not needed, but can be added as a further additional precaution, as it is clear from FIGURE 5 that only in case of a byte operation detectors 162 or 164 can possibly be enabled; detectors 161 and 63 will be needed for half word operations, and detector 163 cannot possibly respond at word or double word type operations, but detector 161 may. The particular byte as selected by the register PA is being passed from the C register to the $D_0$ portion of the D register. The remaining twenty-four bits in the C register will not be transferred and are thus suppressed.

In case of a half word operation, use is being made of the enabling signal in line 192′ when the operate code decoder 19 has detected a half-word type operation with transfer from memory. From the description of indexing it will be recalled that in case of half word operations, the half word address has a zero bit in stage $PA_0$ of the PA register, while the value of the bit held in stage $PA_1$ determines the particular position of the desired half-word. It thus appears, that the two half words are distinguished by situations in which the detectors 161 or detector gate 163 introduces an output signal. Specifically, detector 161 will respond when the half word involved does not need downward alignment. It thus opens gate group 151 as usual. The same signal, but specifically for half word operations can be used to open gate group 152, a gate 165 thus responds to the half word enabling signal in line 192′.

The enabling signals thus provided by the gates 161 and 165 open the two gates 151 and 152 to the exclusion of the other gate groups, so as to transmit one of the half words from the C register to the D register without realignment.

In case the other half word is requested, then the gate 163 responds to control the transfer of one-half of the half word from section $C_2$ to section $D_0$ via gate group 156, which is the same as if this particular byte were involved alone. The enabling signal from gate 163 and the enabling signal in line 192′ is detected by "and" gate 166 to thereby provide an enabling signal to the gate group 158 for the transfer of the other half of a word as held in section $C_3$ to the section $D_1$. This is now downward alignment for a half word.

It can thus be seen that by proper utilization of the 2-bit number held in the PA register the transmission between the C and D registers can be made selective with regard to full word, half words and bytes whereby half words and bytes are realigned to occupy always the same relative position in the registers during processing regardless of the particular location they came from.

Not all operations, of course, require withdrawal of a word, half word, byte, or double word from memory but some instructions will require the transfer of a word, byte, half word or double word from the processor output bus 125 to memory. Here it has to be considered that for reasons described before the data are organized in the processor in that a byte occupies only the eight low order bit channels of the data bus 25, and a half word leaving the processor will occupy the sixteen lower order bit channels of the memory input bus 25. This is the situation of a byte or half word is prepared for transfer from the processor 20 into memory.

The type of instructions requiring the transfer of a byte or a half word to the memory, will include an address field as the memory destination address, and there will also be an X-field. Aside from indexing to change the memory word address location, the indexing integer will now also determine the particular destination location for this half word or byte derivable from the output side of the processors. The PA register will hold a code identifying the particular half word location or the particular byte location, as the case may be, of the memory storage location into which the particular byte or half word is to be transferred. Thus, there must be an upward alignment of bytes and half words. This is the purpose of the eight distributor gate groups 251 through 258. These gate groups form a part of the data bus control for the setting of data from the memory bus into the M register as input thereof, and, of course, from there the memory will be filled in the usual manner by the content of the M register. This distribution does not require elaboration as this is the inversion of the operation of the transmission device 15.

The thirty-two bit channels of bus 25 are divided into four groups of eight channels each respectively denoted 25–1, 25–2, 25–3, and 25–4. For normal full word type operations, for double words, the gate groups 251, 252, 253 and 254 provide for straight forward, unrealigned bit-for-bit transmission from the thirty-two bit channels of bus 25 to the input side of the M register.

For byte type operations all bytes are held in bus 25-1, and they are applied to the input side of gate groups 251, 255, 256 and 257. In dependence upon the particular byte location code held in the PA register, one of the four gate groups will be enabled and the particular byte will be set into the byte position portion of the M register as the PA-code requires. Analogously a half word is held unaligned in the two bus groups 25–1 and 25–2. The two gate groups 251 and 252 transfer this half word directly into the sixteen low order bits of the bit positions of the M register if the PA-register so demands. In the alternative, and as determined by the PA register, the eight low order bits of a half word pass through the gate group 256 and the eight high order bits are passed through gate groups 258 to the eight high order bit positions of the M register. It is apparent that the detectors 161 to 164 will control the gate groups 251, 252, etc. to 258 in an analogous manner as were the gate groups in distributor 15.

We claim:

1. In a digital processing system, having a memory comprised of individually addressable storage locations, each such location having a plurality of storage cells, and including means for accessing the locations, the combination comprising:

first means for providing addressing numbers individually identifying memory locations:

second means for providing address modifying numbers;

means responsive to a modifying number when provided by said second means and subjecting such modifying number to an arithmetic operation to arrive at a second and third modifying number;

means for arithmetically combining said second modifying number with an addressing number as concurrently providde by said first means, thereby providing a resulting addressing number applied to the memory accessing means; and means responsive to said third modifying number for providing operative restrictions for the content of the memory location identified by the resulting addressing number, the restriction relating to the content of a particular number of storage cells in the latter memory location and identified by the third modifying number.

2. In a digital data processing system, having a memory comprised of individually addressable storage locations, each such location having a plurality of storage cells, and including means for accessing the locations, the combination comprising:

first means for providing addressing numbers individually identifying memory locations, to cause said accessing means to access a memory location;

second means for providing an intra-location code number; and means for providing operative restrictions effective to cause only a portion of the addressed memory location to be subjected to processing, the portion being determined by said intra-location code number.

3. In a digital data processing system, having a memory comprised of addressable storage locations, a location for holding one or several operands, the system including means for individually accessing the locations, the combination comprising:

signal means for concurrently providing an addressing number and a first signal which incdludes information to the extent of the size of an operand;

means for providing a signal representing a number;

means responsive to the size-information included in said first signal to separate a particular portion from said number signal and combining said particular portion with said addressing number to form a second addressing number;

means for receiving the content of the memory location identified by said second addressing number; and means for selecting the desired portion of said content as operand in response to the remaining portion of said number signal.

4. In a digital data processing system having a memory of individually addressable storage locations, comprising:

first means for providing signals representing first numbers;

second means for providing signals representing a modifier number;

third means for particularly aligning the modifier number as provided by said second means with a first number as provided by said first means, the same modifying number being aligned differently with different first numbers;

fourth means for arithmetically combining the two numbers as aligned to produce an operating addressing number; and fifth means responsive to the digits of said operating number, having an order lower than the least significant digit of said first number for providing signals representative of particular size portions of the memory location identified by the remaining digits of said addressing number.

5. In a digital data processing system, having a memory comprised of addressable storage locations holding operands and including means for individually accessing the locations, the combination comprising:

signal means for concurrently providing a first signal representative of an operand address and a second signal representative of an operand size;

means for providing a third signal representative of a number;

means responsive to said second signal for separating a particular first portion from said third signal and combining said first portion with said first signal to form an addressing code; and means responsive to the remaining portion of said third signal for selecting the content of a particular portion of the memory location as defined by said addressing code as operand.

6. In a digital data processing system, having a memory comprised of addressable storage locations and including means for individually accessing the locations, the combination comprising:

means for providing a signal representative of a particular number;

an arithmetic unit having two input channels for arithmetically combining signals representing numbers when applied to the two input channels, to form a resulting number;

a register means for holding signals representing a number;

means for providing instruction signals, each instruction signal including an operating code and an addressing number, the addressing number being applied to one of said two input channels;

means responsive to the instruction signals for controlling the distribution of the particular number into the register means and into the other one of said input channels, so that the portion of the number applied to the latter input channel is arithmetically combined with the addressing number whereby the resulting number is a second addressing number to be used in the accessing means; and means responsive to the portion of the number held in the register means for controlling the size of the format of numbers subjected to the operation as called for by the operating code as concurrently provided with an addressing number.

7. In a digital data processing system having a memory comprised of individually addressable storage locations and including means for accessing the locations, further having index registers, the combination comprising:

means for providing instruction signals which include an operating code, an index register identifying code and a memory location addressing number;

means responsive to said operating code to particulraly align the content of the register as identified by said register identifying code with said addressing number, thereby separating a portion of said content from the remaining portion of said content;

means for combining said remaining portion as aligned excluding said separated portion, and said addressing number, to form a second addressing number for use by the accessing means; and means responsive to said separated portion to provide signals for restricting the operation as defined by said operate code, for affecting the content of a particular portion of the memory location as defined by said second addressing number.

8. In a digital data processing system, having a memory comprised of addressable storage locations and including means for individually accessing the locations, the combination comprising:

first means for providing an addressing number to the accessing means;

second means for providing signals identifying a particular portion of the memory location as identified by the addressing number;

means for receiving the entire content of the memory location as identified by said addressing number; and means responsive to said portion identifying signal for selecting the thus identified portion of said content as received by said third means while suppressing the remainder thereof.

9. An addressing system for a memory of a data processing system, the memory having individual storage locations to hold items of information of a selected smallest order of identifiable significance, comprising:

first means for providing addressing numbers in a particular format, the addressing numbers being respectively representative of similar size groups of storage locations, said storage locations being groupwise addressable;

means for supplementing the addressing numbers as provided by said first means by a number representative of at least a particular location within the group identified by an addressing number as provided by said first means;

register means for holding address modifying numbers;

means for dividing the modifying number as held in said register means by a number representative of a fraction identifying a particular size for a portion of a group of storage locations, to arrive at a resulting number;

means for adding a portion of said resulting number to the addressing number as provided by said first means to arrive at a second addressing number identifying a particular group of storage locations; and means responsive to the remaining portion of said resulting number for selecting the content of particular locations among the group of storage locations as identified by said second addressing number.

10. In a digital data processing system, having a memory comprised of individually addressable storage locations, there being access control means for providing individual access to said storage locations in response to addressing numbers identifying the storage locations individually comprising:

first means for providing signals representing memory location addressing numbers interpretable as numbers in binary expansion, and having a format to which the accessing control means can respond;

second means for providing signals representing address modifying numbers in binary expansion;

means for combining a particular portion of a number as provided by the second means, the portion being representative of a division of said number by a power of 2, with an addressing number as provided by said first means to arrive at a resulting number to identify an operand address; and means for providing control signals in response to the remaining portion of said number as provided by said second means, to identify a particular portion of said operand address, among the portions thereof resulting by impliedly dividing the address into as many portions as determined by said power of 2.

11. In a digital data processing system, having a memory comprised of addressable storage locations and including control means for individually accessing the locations, the combination comprising:

program means for providing instructions which include an operate code, an index code and an addressing number for a storage location;

means responsive to the addressing number as provided in an instruction to cause the access control means to access the memory location as identified by the addressing number; and means responsive to the index code and to the operate code as provided by said program means concurrently with said addressing number to provide operative restrictions effective for a particular portion of the content of said accessed memory location.

12. In a digital data processing system, having a memory comprised of addressable storage locations and including means for individually accessing the locations, further having index registers, the combination comprising:

means for providing instruction signals; and means for selectively interpreting an operand in an index register as a multiple and quotient of such operand in response to a portion of an instruction signal.

13. In a digital data processing system, having a memory comprised of addressable storage locations and including means for individually accessing the locations, further having index registers, the combination comprising:

means for providing instruction signals; and means for selectively interpreting an operand held in an index register as a power of 2 multiple and quotient of such operand in response to a portion of an instruction signal.

14. In a digital computer receiving instruction signals, and including information storage locations accessible to arithmetic units and combining units responsive to specified portions of said instruction signal for combining an information storage address portion of said instruction signal with a stored displacement signal to form a displaced address signal for accessing an operand to be operated upon by said instruction signal comprising:

first means responsive to said instruction signal for selectively multiplying and dividing said stored displacement signal by a specified power of 2 prior to accessing said operand; and means responsive to said instruction signal and the fractional remainder of said arithmetic operation for selecting a specified portion of the accessed operand to be operated on in acordance with said instruction signal.

15. In a digital computer receiving instruction signals, and including information storage locations accessible to arithmetic units and combining apparatus responsive to a specified portion of said instruction signal for combining an information storage address portion of said instruction signal with a stored displacement signal to form a displaced location address signal for accessing an operand to be operated upon by said instruction signal comprising:

first means responsive to said instruction signal for selectively multiplying and dividing said stored displacement signal by a specified power of *n* prior to accessing said operand, where *n* is an integer; and means responsive to said instruction signal and the fractional remainder of said arithmetic operation for selecting a specified portion of the accessed operand to be operated on in acordance with said instruction signal.

16. In a digital computer receiving instruction signals, and including information storage locations accessible to arithmetic units and combining apparatus responsive to a specified portion of said instruction signal for combining an information storage location signal in said instruction signal with a stored displacement signal to form a displaced location address signal for accessing an operand to be operated upon by said instruction signal comprising:

first alignment means responsive to said instruction signal for selectively multiplying and dividing said stored displacement signal by a specified power of 2 prior to accessing said operand; and selection means responsive to said instructions signal and the fractional remainder of said arithmetic operation for selecting a specified portion of the accessed operand to be operated on in accordance with said instruction signal.

17. The invention as claimed in claim 16 in which:

said alignment means includes means for aligning the information storage address signal with the stored displacement signal prior to combination resulting in a displaced location address and a remainder; and said selection means includes means for holding the accessed operand prior to transfer to the register in which it will be operated on in accordance with said instruction signal and means interposed between said holding register and said operating register for selecting a particular portion of the accessed operand for transfer to the operating register for operation in accordance with said instruction signal.

18. In a digital computer including storage locations, index registers, and arithmetic units comprising:

means for sensing a 17 character address signal in a computer instruction signal having 32 characters;

means responsive to the presence of data in a 3 character signal in a 32 character computer instruction signal for accessing an indexing displacement value;

means responsive to a 7 character signal in the control portion of said instruction signal for selectively causing a division of the displacement value by a power of 2 and for causing a multiplication of said value by 2;

means for storing the signal representing the fractional remainder of such arithmetic operation;

means for summing said address signal and the integer portion of the signal resulting from said arithmetic operation so as to result in a displaced word address signal;

means for accessing a 32 character computer data unit from the location specified by said displaced address signal;

means for selectively selecting 32 character, 16 character, 8 character, and 32 character plus adjacent data unit size portions of said accessed data unit in response to said 7 character signal; and means for selectively selecting first and second 16 character portions and first, second, third and fourth 8 character portions of said accessed data unit in response to said stored fractional remainder of said arithmetic operation.

19. In a digital computer including storage locations and arithmetic units comprising:

means for sensing 17 character address signal in a computer instruction signal having 32 characters;

means responsive to the presence of data in a 3 character signal in a 32 character computer instruction signal for accessing an indexing displacement value;

means responsive to a 7 character signal in the control portion of said instruction signal for selectively causing a division of the displacement value by a power of 2 and for causing a multiplication of said value by 2;

means for storing the signal representing the fractional remainder of such arithmetic operation;

means for summing said address signal and the integer portion of the signal resulting from said arithmetic operation so as to result in a displaced word address signal;

means for accessing a 32 character computer data unit from the location specified by said displaced address signal;

means for selectively selecting data unit, half unit, quarter unit, and unit plus adjacent unit size portions of said accessed data unit in response to said 7 character signal and means for selectively selecting first and second half unit portions and first, second, third, and fourth quarter unit portions of said accessed data unit in response to said stored fractional remainder of the arithmetic operation.

20. In a digital computer having a 32 binary bit instruction word, 32 binary bit information storage locations, arithmetic units and apparatus responsive to a 7 binary bit portion of said instruction signal for combining a 17 binary bit information storage address signal in said instruction signal with a stored displacement signal to form a 17 binary bit displaced location address for accessing an operand having up to 32 binary bits to be operated upon by said instruction signal comprising:

means responsive to said instruction signal for selectively multiplying and dividing said stored displacement signal by a power of 2 prior to accessing said operand; and means responsive to said instruction signal and the fractional result of said arithmetic operation for selectively selecting a 16 binary bit, 8 binary bit, 32 binary bit operand and the operand plus adjacent operand to be operated on in accordance with said instruction signal.

21. In a digital computer comprising:

means for sensing a computer instruction word address field having *n* binary bits;

means responsive to the presence of data in an $(n-14)$ bit field in a computer instruction word for accessing an indexing displacement value;

means responsive to an $(n-10)$ bit field in the control portion of a computer instruction word for selectively causing a division of the displacement value by a power of 2 and for causing a multiplication of said value by 2;

means for storing the fractional results of such arithmetic operation;

means for summing said address field and the integer portion resulting from said arithmetic operation so as to result in a displaced word address;

means for accessing a computer word having $(n+15)$ bits from the location specified by said displaced address;

means for selectively selecting word, halfword, quarterword and word plus adjacent word size portions of said accessed word in response to said $(n-10)$ bit field; and means for selectively selecting first and second halfword portions and first, second, third and fourth quarter word portions of said accessed word in response to said stored fractional remainder of said arithmetic operation.

References Cited

UNITED STATES PATENTS

| | | | |
|---|---|---|---|
| 3,277,446 | 10/1966 | Diamant et al. ----- | 340—172.5 |
| 3,297,997 | 1/1967 | Grady et al. ------- | 340—172.5 |

PAUL J. HENON, *Primary Examiner.*

R. B. ZACHE, *Assistant Examiner.*